(12) United States Patent
Kim et al.

(10) Patent No.: US 8,613,018 B2
(45) Date of Patent: Dec. 17, 2013

(54) THREE-DIMENSIONAL ELECTRONIC PROGRAMMING GUIDE PROVIDING APPARATUS AND METHOD

(75) Inventors: Yong-jun Kim, Yongin-si (KR);
Jae-kwon Kim, Suwon-si (KR);
Bong-yen Kim, Seongnam-si (KR);
Eun-jung Kang, Suwon-si (KR);
Dong-wook Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 11/590,788

(22) Filed: Nov. 1, 2006

(65) Prior Publication Data

US 2007/0199021 A1     Aug. 23, 2007

(30) Foreign Application Priority Data

Feb. 17, 2006 (KR) .......................... 10-2006-0015629
Feb. 17, 2006 (KR) .......................... 10-2006-0015630

(51) Int. Cl.
*H04N 5/445* (2011.01)
*G06F 3/00* (2006.01)
*G06F 13/00* (2006.01)

(52) U.S. Cl.
USPC ................... 725/39; 725/40; 725/44; 725/52; 725/56

(58) Field of Classification Search
None
See application file for complete search history.

(56) References Cited

U.S. PATENT DOCUMENTS

| | | | |
|---|---|---|---|
| 5,485,197 A * | 1/1996 | Hoarty | 725/37 |
| 6,061,097 A | 5/2000 | Satterfield | |
| 6,266,098 B1 | 7/2001 | Cove et al. | |
| 6,774,914 B1 | 8/2004 | Benayoun | |
| 7,134,095 B1 * | 11/2006 | Smith et al. | 715/860 |
| 7,546,621 B2 * | 6/2009 | LaJoie et al. | 725/39 |
| 2002/0069415 A1 | 6/2002 | Humbard et al. | |
| 2003/0090524 A1 | 5/2003 | Segerberg et al. | |
| 2003/0167466 A1 * | 9/2003 | Nakamura et al. | 725/39 |
| 2004/0181804 A1 | 9/2004 | Billmaier et al. | |
| 2005/0097602 A1 * | 5/2005 | Murakami et al. | 725/44 |
| 2005/0097603 A1 | 5/2005 | Kikinis | |

FOREIGN PATENT DOCUMENTS

| | | |
|---|---|---|
| CN | 1041234 A | 4/1990 |
| CN | 1219322 A | 6/1999 |
| JP | 2001-169197 A | 6/2001 |

(Continued)

OTHER PUBLICATIONS

Communication dated Jun. 26, 2007 from the Korean Intellectual Property Office in a counterpart application No. 10-2006-0015630.

*Primary Examiner* — Nasser Goodarzi
*Assistant Examiner* — Fred Peng
(74) *Attorney, Agent, or Firm* — Sughrue Mion, PLLC

(57) ABSTRACT

An electronic programming guide (EPG) providing apparatus and method, in which an EPG is configured as a 3D form to facilitate a search for broadcasting program information included in the EPG. The EPG providing apparatus includes an EPG screen configuring unit and a control unit. The EPG screen configuring unit configures an EPG screen such that broadcasting program information is displayed on at least three faces of a 3D polyhedron. The control unit controls the EPG screen configuring unit to configure the EPG screen such that broadcasting program information corresponding to another broadcasting time zone or another broadcasting channel is displayed on the EPG screen based on a user input signal requesting a search for the broadcasting program information corresponding to another broadcasting time zone or another broadcasting channel.

15 Claims, 11 Drawing Sheets

(56) References Cited

FOREIGN PATENT DOCUMENTS

| | | |
|---|---|---|
| JP | 2002-101358 A | 4/2002 |
| JP | 2002374476 | 12/2002 |
| KR | 10-2004-0009262 A | 1/2004 |
| KR | 10-2004-0040671 A | 5/2004 |
| WO | 97/18670 A1 | 5/1997 |
| WO | 00/46680 | 8/2000 |
| WO | 01/73596 A2 | 10/2001 |
| WO | 02/25626 A1 | 3/2002 |

* cited by examiner

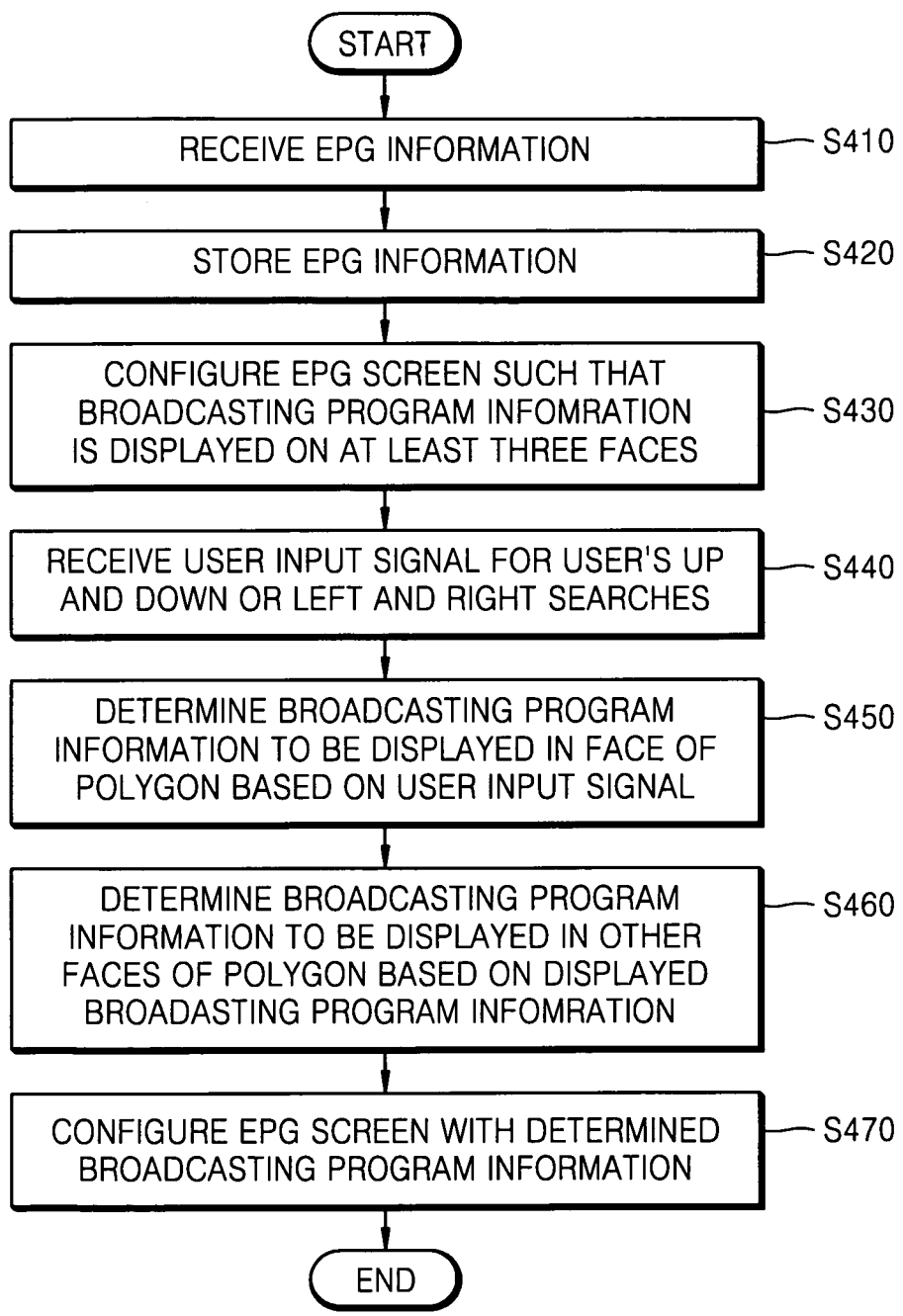

THREE-DIMENSIONAL ELECTRONIC PROGRAMMING GUIDE PROVIDING APPARATUS AND METHOD

CROSS-REFERENCE TO RELATED PATENT APPLICATION

This application claims the benefit of Korean Patent Application No. 10-2006-0015629, and 10-2006-0015630, filed on Feb. 17, 2006, in the Korean Intellectual Property Office, the disclosures of which are incorporated herein in their entirety by reference.

BACKGROUND OF THE INVENTION

1. Field of the Invention

The present invention relates to an electronic programming guide (EPG) providing apparatus and method, and more particularly, to an EPG providing apparatus and method, in which an EPG is configured as a 3D form to facilitate a search for broadcasting program information included in the EPG.

2. Description of the Related Art

The utility of an electronic programming guide (EPG) becomes an increasing matter of concern in an environment where broadcasting services are provided over multiple channels through various media such as terrestrial waves, satellites, and cables. Users are generally provided with EPG information by manipulating a multimedia recording device such as a personal video recorder (PVR) that provides an EPG using a remote controller.

The EPG generally provides a broadcasting program list in the form of a two-dimensional (2D) lattice. The EPG in the 2D lattice form includes rows that show lists of broadcasting programs provided by different channels and columns that show lists of broadcasting programs provided at different broadcasting times. However, the EPG in the 2D lattice form has problems as follows. First, since broadcasting program information is displayed within a limited space, i.e., a single square cell, only a portion of the broadcasting program information can be displayed. Moreover, the size of the displayed characters should be reduced to display as much information as possible within the cell having a limited size, resulting in degradation of readability of the information.

SUMMARY OF THE INVENTION

The present invention provides an EPG providing apparatus and method, in which an EPG is configured as a 3D form to facilitate a search for broadcasting program information included in the EPG.

According to one aspect of the present invention, there is provided an EPG providing apparatus including an EPG screen configuring unit and a control unit. The EPG screen configuring unit configures an EPG screen such that broadcasting program information is displayed on at least three faces of a 3D polyhedron. The control unit controls the EPG screen configuring unit to configure the EPG screen such that broadcasting program information corresponding to another broadcasting time zone or another broadcasting channel is displayed on the EPG screen based on a user input signal requesting a search for the broadcasting program information corresponding to another broadcasting time zone or another broadcasting channel.

The 3D polygon may be a hexagon.

The EPG providing apparatus may further include a broadcasting signal processing unit, a network unit, a storing unit, and a decoder. The broadcasting signal processing unit receives and processes a broadcasting signal including EPG information and broadcasting program content. The network unit receives the EPG information from an EPG server connected to a network. The storing unit stores the received EPG information and broadcasting program contents. The decoder decodes the broadcasting program contents processed by the broadcasting signal processing unit or read from the storing unit.

The control unit may determine broadcasting program information corresponding to a predetermined broadcasting channel or a predetermined broadcasting time zone (e.g., a time slot) as broadcasting program information to be displayed on a first or front face of the polyhedron, and may determine broadcasting program information to be displayed on the other faces of the polyhedron based on the broadcasting program information to be displayed on the first face of the polyhedron, and the EPG screen configuring unit may configure the EPG screen such that the determined broadcasting program information is displayed on the first face and the other faces of the polyhedron.

When the control unit determines the broadcasting program information to be displayed on the other faces of the polyhedron, it may determine broadcasting program information corresponding to a broadcasting channel that is the same as, and a broadcasting time zone that is different from, the broadcasting program information displayed on the first face of the polyhedron as broadcasting program information to be displayed on a second face positioned in a predetermined direction with respect to the first face of the polyhedron, and determine broadcasting program information corresponding to a broadcasting time zone that is the same as, and a broadcasting channel that is different from, the broadcasting program information to be displayed on the first face of the polyhedron as broadcasting program information to be displayed on a third face positioned perpendicularly to the predetermined direction with respect to the first face of the polyhedron.

The control unit may determine broadcasting program information corresponding to another broadcasting time zone requested by a user as broadcasting program information to be displayed on a first face of the polyhedron based on a user input signal for the user's up and down or left and right searches, and determine broadcasting program information to be displayed on the other faces of the polyhedron based on the broadcasting program information to be displayed on the first face of the polyhedron.

The control unit may determine broadcasting program information corresponding to another broadcasting channel requested by a user as broadcasting program information to be displayed on a first face of the polyhedron based on a user input signal for the user's up and down or left and right searches and determine broadcasting program information to be displayed on the other faces of the polyhedron based on the broadcasting program information to be displayed on the first face of the polyhedron.

According to another aspect of the present invention, there is provided an EPG providing method including receiving a user input signal requesting a search for broadcasting program information corresponding to another broadcasting time zone or another broadcasting channel and configuring an EPG screen such that the broadcasting program information is displayed in the form of a 3D polyhedron based on the user input signal. The EPG screen is configured such that the broadcasting program information is displayed on at least three faces of the 3D polyhedron.

According to still another aspect of the present invention, there is provided an EPG providing apparatus including an EPG screen configuring unit and a control unit. The EPG screen configuring unit configures an EPG screen such that broadcasting program information is displayed on a front face of a 3D hexagon and four faces of the 3D hexagon, which are adjacent to the front face. The control unit controls the EPG screen configuring unit to configure the EPG screen such that broadcasting program information corresponding to another broadcasting time zone or another broadcasting channel is displayed on the EPG screen based on a user input signal requesting a search for the broadcasting program information corresponding to another broadcasting time zone or another broadcasting channel.

The EPG providing apparatus may further include a broadcasting signal processing unit, a network unit, a storing unit, and a decoder. The broadcasting signal processing unit receives and processes a broadcasting signal including EPG information and broadcasting program contents. The network unit receives the EPG information from an EPG server connected to a network. The storing unit stores the received EPG information and broadcasting program contents. The decoder decodes the broadcasting program contents processed by the broadcasting signal processing unit or read from the storing unit.

The control unit may determine broadcasting program information corresponding to a predetermined broadcasting channel and a predetermined broadcasting time zone as broadcasting program information to be displayed on the front face of the hexagon and determine broadcasting program information to be displayed on the four faces adjacent to the front face based on the broadcasting program information to be displayed on the front face of the hexagon, and the EPG screen configuring unit may configure the EPG screen such that the determined broadcasting program information is displayed on the front face and the four faces adjacent to the front face.

When the control unit determines the broadcasting program information to be displayed on the four faces adjacent to the front face, it may determine broadcasting program information corresponding to a broadcasting channel that is the same as and broadcasting time zones that are different from the broadcasting program information displayed on the front face of the hexagon as broadcasting program information to be displayed on faces that are adjacent in a predetermined direction with respect to the front face of the hexagon and determine broadcasting program information corresponding to a broadcasting time zone that is the same as and broadcasting channels that are different from the broadcasting program information displayed on the front face of the hexagon as broadcasting program information to be displayed on faces that are adjacent perpendicularly to the predetermined direction with respect to the front face of the hexagon.

When the control unit determines the broadcasting program information to be displayed on the faces that are adjacent perpendicularly to the predetermined direction with respect to the front face of the hexagon, it may determine broadcasting program information corresponding to a broadcasting time zone that precedes the broadcasting program information to be displayed on the front face as broadcasting program information to be displayed on the top face between the faces that are adjacent in the predetermined direction with respect to the front face and determine broadcasting program information corresponding to a broadcasting time zone that follows the broadcasting program information to be displayed on the front face as broadcasting program information to be displayed on the bottom face between the faces that are adjacent in the predetermined direction with respect to the front face.

The control unit may determine broadcasting program information corresponding to another broadcasting time zone requested by a user as broadcasting program information to be displayed on the front face of the hexagon based on a user input signal for the user's up and down or left and right searches and determine broadcasting program information to be displayed on the four faces adjacent to the front face based on the broadcasting program information to be displayed on the front face of the hexagon.

The control unit may determine broadcasting program information corresponding to another broadcasting channel requested by a user as broadcasting program information to be displayed on the front face of the hexagon based on a user input signal for the user's up and down or left and right searches and determine broadcasting program information to be displayed on the four faces adjacent to the front face based on the broadcasting program information to be displayed on the front face of the hexagon.

According to yet another aspect of the present invention, there is provided an EPG providing method including receiving a user input signal requesting a search for broadcasting program information corresponding to another broadcasting time zone or another broadcasting channel and configuring an EPG screen such that the broadcasting program information is displayed in the form of a 3D hexagon based on the user input signal. The EPG screen is configured such that the broadcasting program information is displayed on a front face of the 3D hexagon and four faces adjacent to the front face.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart illustrating an EPG providing method according to a second embodiment of the present invention;

DETAILED DESCRIPTION OF THE INVENTION

Hereinafter, exemplary embodiments of the present invention will be described in detail with reference to the accompanying drawings.

Figure 1:
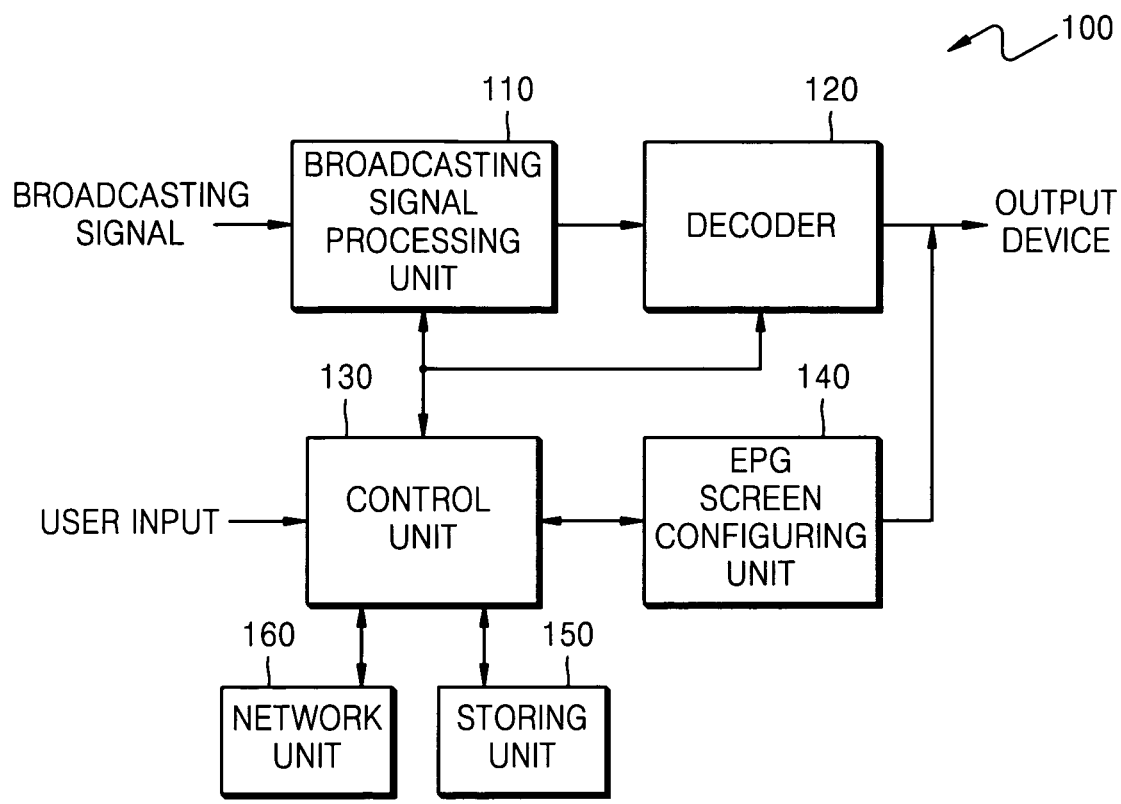
FIG. 1 is a block diagram of an EPG providing apparatus according to the present invention.

FIG. 1 is a block diagram of an electronic programming guide (EPG) providing apparatus 100 according to an embodiment of the present invention. The EPG providing apparatus 100 is provided with broadcasting program contents and EPG information from a broadcasting station or with EPG information from an EPG provider such as an operator who provides EPG services. The EPG information is broadcast program information which may include titles, broadcasting channels, broadcasting time, categories of broadcasting programs, the number of broadcasting times, starring actors, and brief information on the broadcasting program information. The EPG providing apparatus 100 may be implemented with a personal video recorder (PVR), a personal computer (PC), or other devices capable of receiving and recording broadcasting program information. The EPG providing apparatus 100 can receive and store the EPG information of all broadcasting channels at a specific time moment set by a user or at the issuance of an EPG information update command. The EPG providing apparatus 100 configures and provides the EPG in the form of a 3D polyhedron according to a first embodiment of the present invention. The EPG providing apparatus 100 may also configure and provide the EPG in the form of a 3D hexahedron according to a second embodiment of the present invention.

To this end, the EPG providing apparatus 100 according to the present invention includes a broadcasting signal processing unit 110, a decoder 120, a control unit 130, an EPG screen configuring unit 140, a storing unit 150, and a network unit 160. The broadcasting signal processing unit 110 processes a received broadcasting signal to generate broadcasting program contents and EPG information. The broadcasting signal processing unit 110 may include a tuner (not shown) that tunes and demodulates a broadcasting signal input through a specific channel selected by a user and outputs a transport stream and a demultiplexer (not shown) that demultiplexes a multiplexed transport stream output from the tuner into broadcasting program contents including a video stream and an audio stream and EPG information. The configuration of the broadcasting signal processing unit 110 may vary with the type of broadcasting signal to be processed.

The decoder 120 receives the video/audio audio transport streams from the demultiplexer and decodes them to output video/audio signals. The decoder 120 reads broadcasting program contents stored in the storing unit 150 and decodes and outputs the read broadcasting program contents under the control of the control unit 130.

The control unit 130 stores the broadcasting program contents and the EPG information generated by the broadcasting signal processing unit 110 in the storing unit 150. Upon receipt of a user input signal requesting an EPG from a user input device such as a remote controller, the control unit 130 reads the EPG information stored in the storing unit 150 and controls the EPG screen configuring unit 140 to configure an EPG screen for providing an EPG to the user using the read EPG information.

The control unit 130 receives a user input signal requesting a search for broadcasting program information corresponding to other broadcasting time zones or other broadcasting channels. The control unit 130 then controls the EPG screen configuring unit 140 to configure an EPG screen based on the received user input signal such that the broadcasting program information corresponding to other broadcasting time zones or other broadcasting channels is displayed on the EPG screen.

The network unit 160 receives the EPG information from an EPG server connected to a network. If the control unit 130 determines that the EPG information cannot be obtained from the received broadcasting signal, it may control the network unit 160 to receive the EPG information from the EPG server. The received EPG information is stored in the storing unit 150.

The EPG screen configuring unit 140 configures an EPG screen such that broadcasting program information is displayed on at least three faces of a 3D polyhedron. Hereinafter, EPG screens provided by the EPG providing apparatus 100 according to the first embodiment of the present invention will be described with reference to FIGS. 2A through 2C.

According to a second embodiment of the present invention, the EPG screen configuring unit 140 configures the EPG screen such that broadcasting program information is displayed on the front face of a 3D hexahedron and four faces adjacent to the front face. EPG screens provided by the EPG providing apparatus 100 according to the second embodiment of the present invention will be described later with reference to FIGS. 5A through 5C.

Figure 2A:
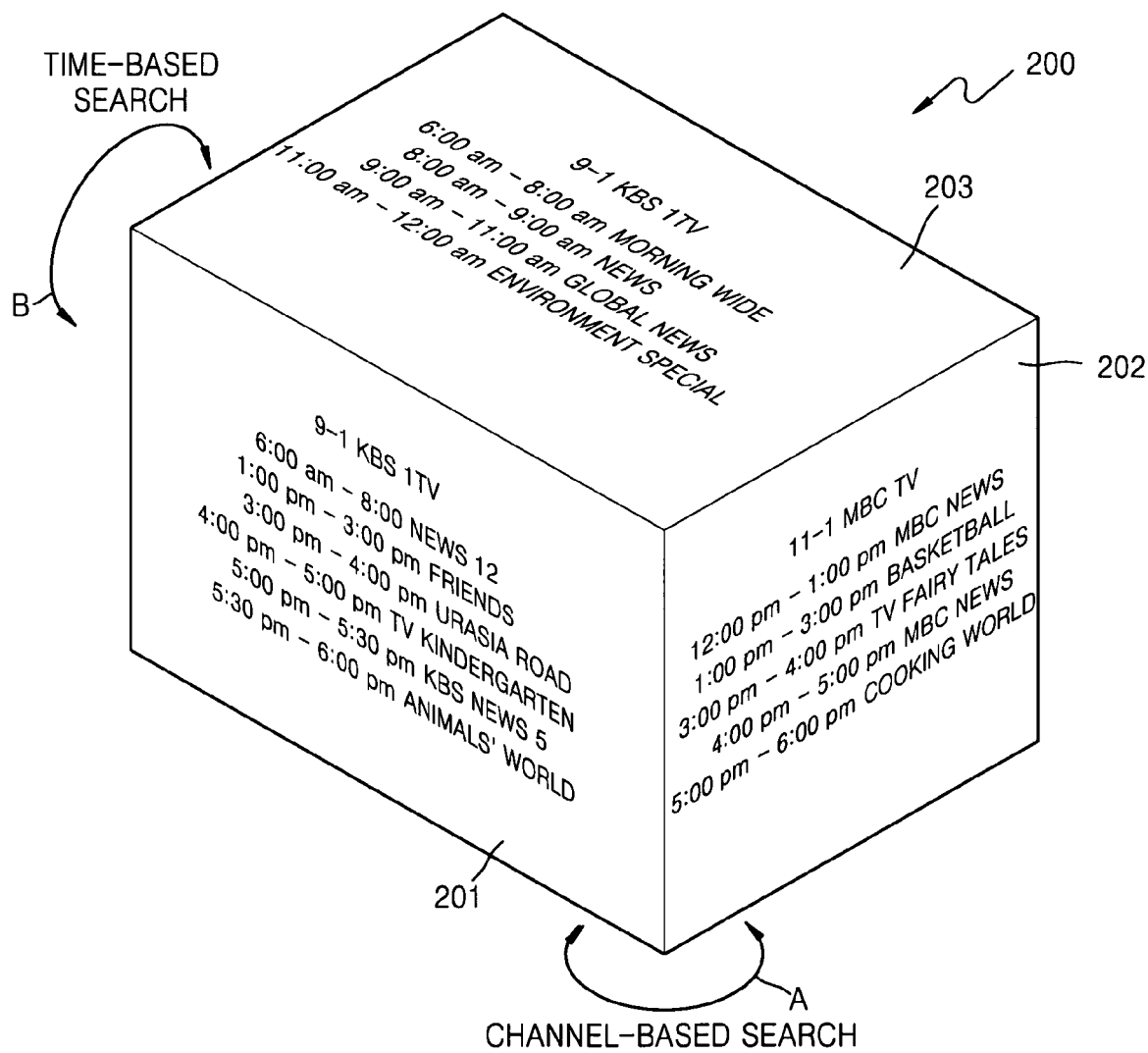
FIGS. 2A through 2C illustrate EPG screens provided by an EPG providing apparatus according to a first embodiment of the present invention.

FIG. 2A illustrates an EPG screen provided by the EPG providing apparatus 100 according to the first embodiment of the present invention. As illustrated in FIG. 2A, the EPG screen configuring unit 140 configures an EPG screen in the form of a 3D polyhedron 200. The EPG screen configuring unit 140 configures a polyhedral EPG screen such that broadcasting program information is displayed on at least three faces of the 3D polyhedron 200.

The control unit 130 determines broadcasting program information corresponding to a predetermined broadcasting time zone and a predetermined broadcasting channel as broadcasting program information to be displayed on a face of the polyhedron 200. The broadcasting program information to be displayed on a face of the polyhedron 200 may be determined by the broadcasting time of a broadcasting channel a user was viewing or the broadcasting time zone of a specific broadcasting channel.

The control unit 130 determines broadcasting program information to be displayed on the other faces of the polyhedron 200 based on the broadcasting program information displayed on the first or front face of the polyhedron 200. In other words, the control unit 130 determines broadcasting program information corresponding to a broadcasting time zone that is different from and a broadcasting channel that is the same as the broadcasting program information displayed on a first face of the polyhedron 200 as broadcasting program information to be displayed on a second face positioned in a predetermined direction with respect to the first face, e.g., the second face positioned vertically with respect to the first face in FIG. 2A. The control unit 130 also determines broadcasting program information corresponding to a broadcasting channel that is different from and a broadcasting time zone that is the same as the broadcasting program information displayed on the first face of the polyhedron 200 as broadcasting program information to be displayed on a third face positioned perpendicularly to the predetermined direction with respect to the first face, e.g., the third face positioned horizontally with respect to the first face in FIG. 2A. The EPG screen configuring unit 140 configures an EPG screen under the control of the control unit 130 such that the determined broadcasting program information is displayed on the first face and the other faces, i.e., the second face positioned in the predetermined direction with respect to the first face or the third face positioned perpendicularly to the predetermined direction with respect to the first face.

In the EPG screen of FIG. 2A, broadcasting program information corresponding to a broadcasting channel KBS 1TV 9-1 and a broadcasting time zone 12:00 pm-6:00 pm is displayed on a front face 201 of the polyhedron 200. Broadcasting program information corresponding to a broadcasting channel that is different from and a broadcasting time zone that is the same as the broadcasting program information displayed on the front face 201, i.e., corresponding to a broadcasting channel MBC TV 11-1 and the broadcasting time zone 12:00 pm-6:00 pm is displayed on a side face 202 positioned horizontally with respect to the front face 201. Broadcasting program information corresponding to a broadcasting channel that is the same as and a broadcasting time zone that is previous to the broadcasting program information displayed on the front face 201, i.e., corresponding to the broadcasting channel KBS 1TV 9-1 and a broadcasting time zone 6:00 am-12:00 am, is displayed on a top face 203 positioned vertically with respect to the front face 201.

The EPG providing apparatus 100 according to the present invention searches for and provides broadcasting program information corresponding to another broadcasting channel according to a user input signal for the user's left and right searches as indicated by an arrow A and searches for and provides broadcasting program information corresponding to another broadcasting time zone according to a user input signal for the user's up and down searches as indicated by an arrow B.

Although the 3D polygon 200 of FIG. 2A is a hexagon having square faces, it may take various polygonal forms in which broadcasting program information is displayed on at least three faces. An EPG screen may have faces in different forms and, for example, its top face and bottom face may be pentagonal or hexagonal and the other side faces may be quadrangular. Although broadcasting program information is displayed on the right side face and the top face of the 3D polygon 200 in FIG. 2A, the EPG screen may be configured as a polygon that displays broadcasting program information on its left side face and bottom face or may have various other forms. The amount of broadcasting program information displayed on each face of a 3D polyhedron may be adjusted in consideration of the area of each face or user readability. In addition, although broadcasting time zones and titles of broadcasting programs are displayed as broadcasting program information in FIG. 2A, other broadcasting program information may be additionally displayed. Moreover, a time-based searching direction is a vertical direction and a channel-based searching direction is a horizontal direction in FIG. 2A, but a reverse implementation thereto is also possible.

Figure 2B:
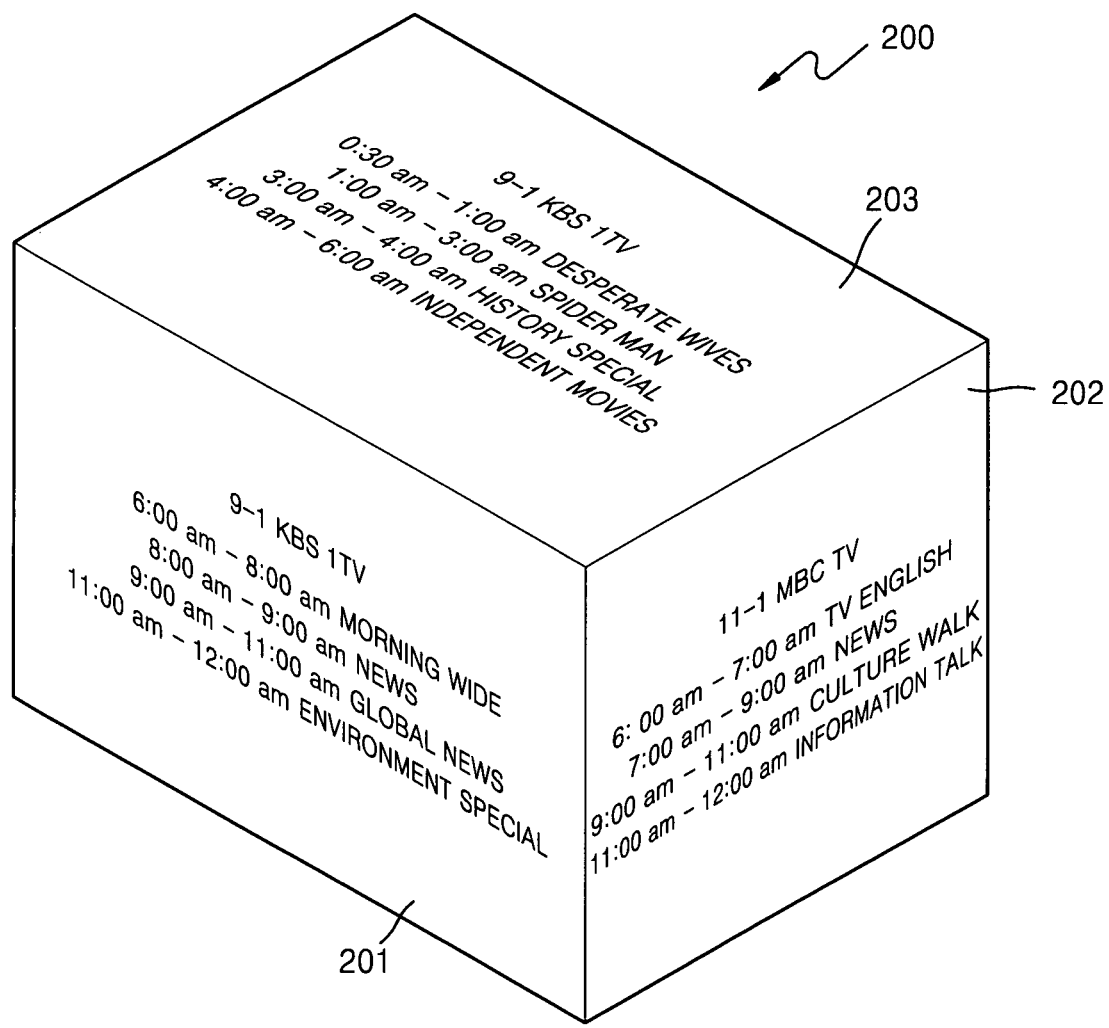

FIG. 2B illustrates an EPG screen configured according to the user input signal for the user's up and down searches according to the first embodiment of the present invention. The control unit 130 controls the EPG screen configuring unit 140 to configure an EPG screen based on the user input signal for the user's up and down searches to request a search for broadcasting program information corresponding to another broadcasting time zone.

For example, if the user inputs a user input signal using up and down buttons of a remote controller, the control unit 130 may search in the storing unit 150 for broadcasting program information corresponding to another broadcasting time zone requested by the user. The control unit 130 then determines the broadcasting program information corresponding to the requested broadcasting time zone as broadcasting program information to be displayed on the first face of the polygon 200 and determines broadcasting program information to be displayed on the other faces of the polygon 200 based on the broadcasting program information displayed on the first face of the polygon 200. As mentioned above, the control unit 130 determines broadcasting program information corresponding to a broadcasting channel that is the same as, and a broadcasting time zone that is different from, the broadcasting program information displayed on the first face of the polygon 200 as broadcasting program information to be displayed on a second face positioned in a predetermined direction with respect to the first face of the polygon 200, e.g., the second face positioned vertically with respect to the first face. The control unit 130 then determines broadcasting program information corresponding to a broadcasting channel that is different from, and a broadcasting time zone that is the same as, the broadcasting program information displayed on the first face of the polygon 200 as broadcasting program information to be displayed on a third face positioned perpendicularly to the predetermined direction with respect to the first face, e.g., the third face positioned horizontally with respect to the first face in FIG. 2B. The EPG screen configuring unit 140 then configures an EPG screen under the control of the control unit 130 such that the determined broadcasting program information is displayed on the first face and the other faces of the polygon 200.

FIG. 2B illustrates one of EPG screens during a process of searching for broadcasting program information of KBS 1TV corresponding to another broadcasting time zone according to the user input signal for the user's up and down searches in the EPG screen of FIG. 2A. Broadcasting program information of KBS 1TV corresponding to a broadcasting time zone 6:00 am-12:00 am requested by the user is displayed on the front face 201 of the polygon 200. Broadcasting program information of KBS 1TV corresponding to a broadcasting time zone 0:30 am-6:00 am that precedes the broadcasting program information displayed on the front face 201 of the polygon 200 is displayed on the top face 203 of the polygon 200. Broadcasting program information corresponding to a broadcasting channel 11-1 MBC TV that is different from, and a broadcasting time zone 6:00 am-12:00 am that is the same as, the broadcasting program information displayed on the front face 201 is displayed on the side face 202 of the polygon 200. Thus, the EPG providing apparatus 100 according to the present invention interactively responds to the user input signal for the user's up and down searches to allow a polygon to display broadcasting program information corresponding to the same broadcasting channel and another broadcasting time zone while moving vertically. Therefore, the user can intuitively search an EPG using the EPG providing apparatus 100 according to the present invention.

Figure 2C:
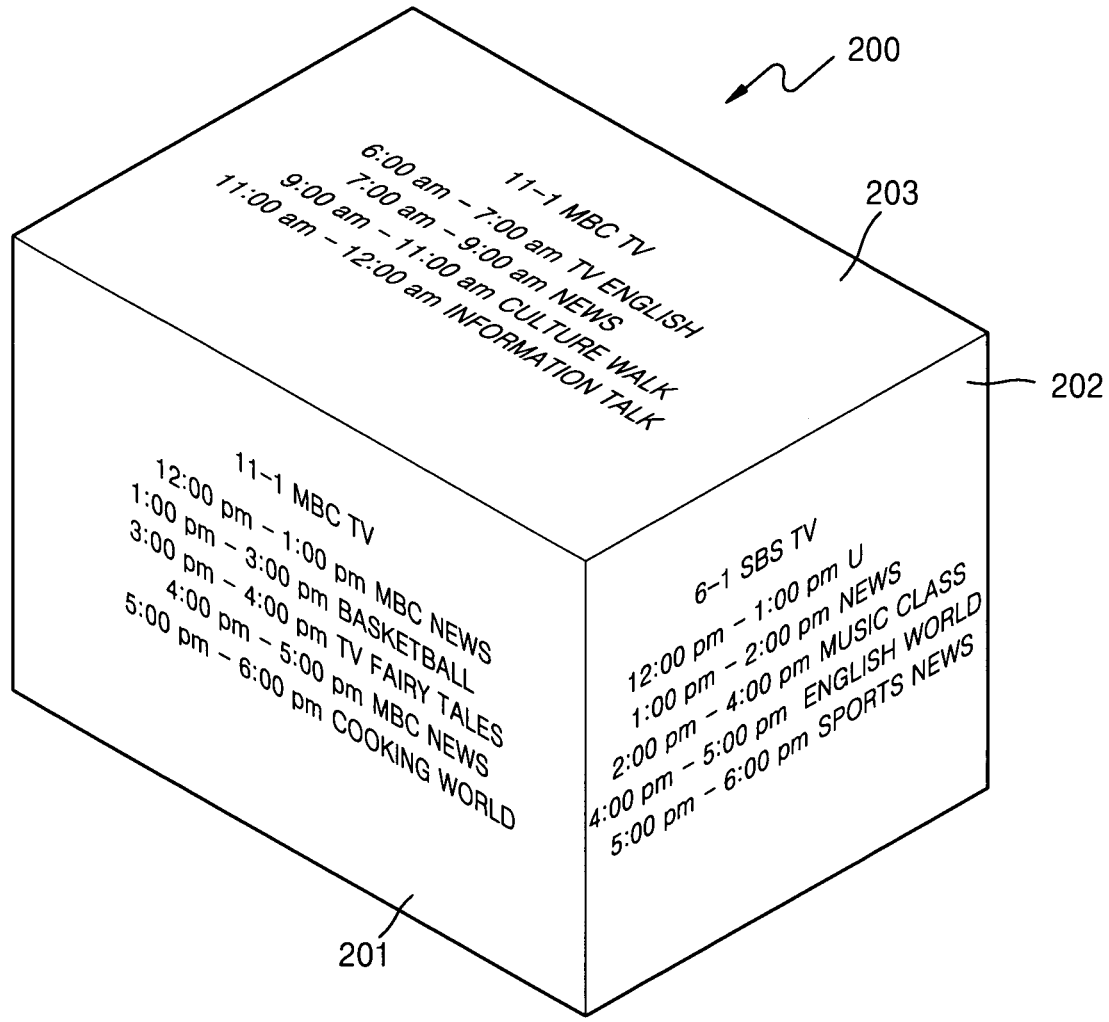

FIG. 2C illustrates an EPG screen configured based on the user input signal for user's left and right searches according to the first embodiment of the present invention. The control unit 130 controls the EPG screen configuring unit 140 to configure an EPG screen based on the user input signal for the user's left and right searches to request a search for broadcasting program information corresponding to another broadcasting channel.

For example, if the user inputs the user input signal for user's left and right searches using left and right buttons of the remote controller, the control unit 130 searches for broadcasting program information corresponding to a next broadcasting channel requested by the user. The control unit 130 then determines broadcasting program information corresponding to the requested broadcasting channel as broadcasting program information to be displayed on a first face of the polygon 200 and determines broadcasting program information to be displayed on the other faces of the polygon 200 based on the broadcasting program information displayed on the first face. As mentioned above, the control unit 130 determines broadcasting program information corresponding to a broadcasting channel that is the same as, and a broadcasting time zone that is different from, the broadcasting program information displayed on the first face of the polygon 200 as broadcasting program information to be displayed on a face positioned in a predetermined direction with respect to the first face, e.g., a face positioned vertically with respect to the first face in FIG. 2B. The control unit 130 determines broadcasting program information corresponding to a broadcasting time zone that is the same as, and a broadcasting channel that is different from, the broadcasting program information displayed on the first face of the polygon 200 as broadcasting program information to be displayed on a face positioned perpendicularly to the predetermined direction with respect to the first face, e.g., a face positioned horizontally with respect to the first face in FIG. 2B. The EPG screen configuring unit 140 then configures an EPG screen under the control of the control unit 130 such that the determined broadcasting program information is displayed on the first face and the other faces of the polygon 200.

FIG. 2C illustrates one of EPG screens during a process of searching for broadcasting program information corresponding to another broadcasting channel based on the same broadcasting time zone according to the user input signal for the user's left and right searches in the EPG screen of FIG. 2A. Broadcasting program information corresponding to a broadcasting channel 11-1 MBC TV requested by the user and a broadcasting time zone 12:00 pm-6:00 pm is displayed on the front face 201 of the polygon 200. Broadcasting program information of 11-1 MBC TV corresponding to a broadcasting time zone 6:00 am-12:00 am that precedes the broadcasting program information displayed on the front face 201 of the polygon 200 is displayed on the top face 203 of the polygon 200. Broadcasting program information corresponding to a broadcasting channel SBS TV that is different from and a broadcasting time zone 12:00 pm-6:00 pm that is the same as the broadcasting program information displayed on the front face 201 is displayed on the side face 202 of the polygon 200. Thus, the EPG providing apparatus 100 according to the present invention interactively responds to the user input signal for the user's left and right searches to allow a polygon to display broadcasting program information corresponding to the same broadcasting time zone and another broadcasting channel while moving horizontally. Therefore, the user can intuitively search an EPG using the EPG providing apparatus 100 according to the present invention.

Figure 3:
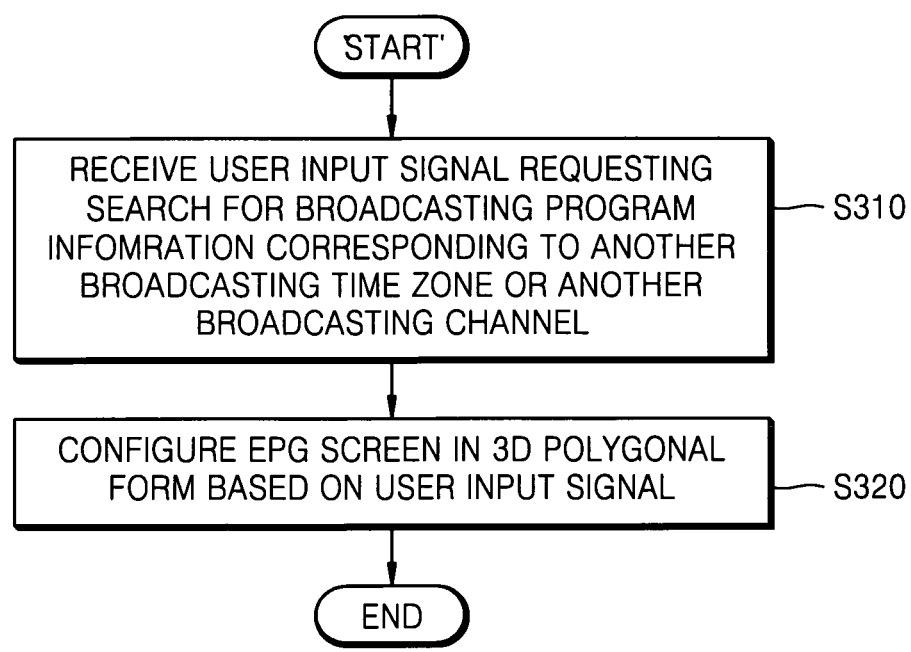
FIG. 3 is a flowchart illustrating an EPG providing method according to a first embodiment of the present invention.

FIG. 3 is a flowchart illustrating an EPG providing method according to a first embodiment of the present invention.

The control unit 130 receives a user input signal requesting a search for broadcasting program information corresponding to another broadcasting time zone or another broadcasting channel in operation S310. Based on the user input signal, the control unit 130 controls the EPG screen configuring unit 140 to configure an EPG screen such that broadcasting program information corresponding to another broadcasting time zone or another broadcasting channel is displayed on a 3D polyhedron, in operation S320. The EPG screen is configured such that the broadcasting program information is displayed on at least three faces of the 3D polyhedron.

FIG. 4 is a flowchart illustrating an EPG providing method according to a second embodiment of the present invention.

The broadcasting signal processing unit 110 processes a broadcasting signal including EPG information or receives EPG information from an EPG server connected to a network in operation S410. The control unit 130 stores the received EPG information in the storing unit 150 in operation S420. The EPG screen configuring unit 140 configures an EPG screen such that broadcasting program information is displayed on at least three faces of the 3D polyhedron using the EPG information, and the configured EPG screen is displayed through an output device in operation S430.

Once a user input signal for the user's up and down or left and right searches is input to request a search for broadcasting program information corresponding to another broadcasting time zone or another broadcasting channel in operation S440, the control unit 130 determines broadcasting program information corresponding to the requested broadcasting time zone or broadcasting channel as broadcasting program information to be displayed on a face of the polyhedron based on the user input signal in operation S450. The control unit 130 then determines broadcasting program information to be displayed on the other faces of the polyhedron based on the broadcasting program information to be displayed on the determined face of the polyhedron in operation S460.

In other words, broadcasting program information to be displayed on a face positioned in a predetermined direction with respect to the determined face of the polyhedron is determined as broadcasting program information corresponding to a broadcasting channel that is the same as, and a broadcasting time zone that is different from, the broadcasting program information displayed on the determined face of the polyhedron, and broadcasting program information to be displayed on a face positioned perpendicularly to the predetermined direction with respect to the determined face of the polyhedron is determined as broadcasting program information corresponding to a broadcasting time zone that is the same as, and a broadcasting channel that is different from, the broadcasting program information displayed on the determined face of the polyhedron. The EPG screen configuring unit 140 then configures an EPG screen such that the determined broadcasting program information is displayed on corresponding faces of the 3D polyhedron, i.e., the first face and the other faces of the 3D polyhedron in operation S470. The configured EPG screen is displayed through an output device.

Hereinafter, an EPG providing apparatus according to a second embodiment of the present invention will be described.

Figure 5A:
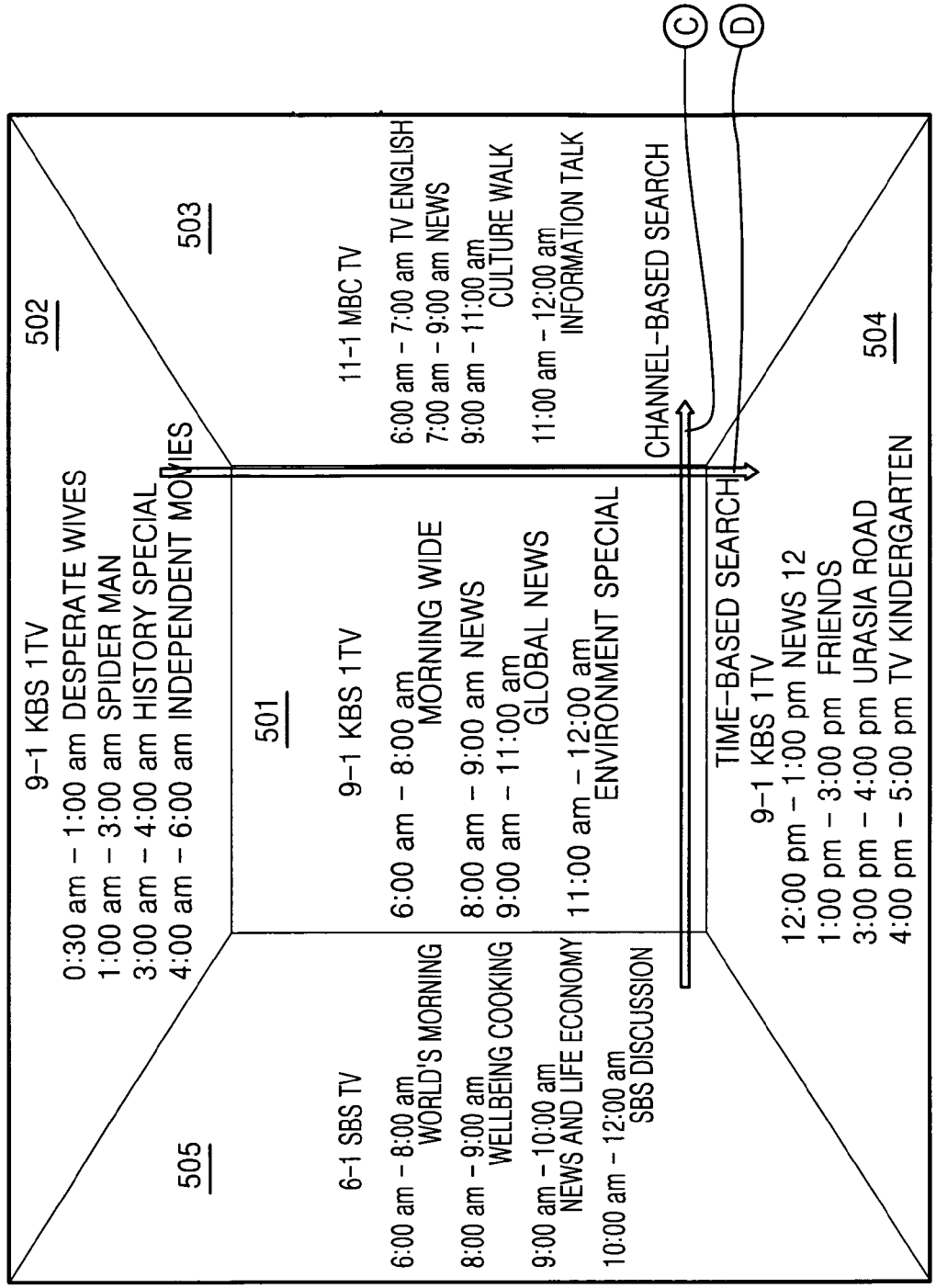
FIGS. 5A through 5C illustrate EPG screens provided by an EPG providing apparatus according to a second embodiment of the present invention.

FIG. 5A illustrates an EPG screen provided by the EPG providing apparatus 100 according to the present invention. As illustrated in FIG. 5A, the EPG screen configuring unit 140 configures a hexagonal EPG screen in which broadcasting program information is displayed on five faces. In FIG. 5A, broadcasting program information is displayed on a front face 501 of a hexagon 500 and four faces 502, 503, 504, and 505 adjacent to the front face 501.

The control unit 130 determines broadcasting program information corresponding to a predetermined broadcasting channel and a predetermined broadcasting time zone as broadcasting program information to be displayed on the front face 501 of the hexagon 500. The broadcasting program information displayed on the front face 501 of the hexagon 500 may be determined by the broadcasting time of a broadcasting channel a user is viewing or the broadcasting time zone of a specific broadcasting channel.

The control unit 130 determines broadcasting program information to be displayed on the faces 502, 503, 504, and 505 based on the broadcasting program information displayed on the front face 501. In other words, the control unit 130 determines broadcasting program information corresponding to a broadcasting channel that is the same as, and a broadcasting time zone that is different from, the broadcasting program information displayed on the front face 501 of the hexagon 500 as broadcasting program information to be displayed on faces adjacent in a predetermined direction with respect to the front face 501, e.g., the faces 502 and 504 that are vertically adjacent to the front face 501 in FIG. 5A. The control unit 130 then determines broadcasting program information corresponding to a broadcasting time zone that is the same as, and a broadcasting channel that is different from, the broadcasting program information displayed on the front face 501 of the hexagon 500 as broadcasting program information to be displayed on faces adjacent perpendicularly to the predetermined direction, e.g., the faces 503 and 505 that are horizontally adjacent to the front face 501 in FIG. 5A.

In the EPG screen of FIG. 5A, broadcasting program information corresponding to a broadcasting channel KBS 1TV 9-1 and a broadcasting time zone 6:00 am-12:00 am is displayed on the front face 501 of the hexagon 500. Broadcasting program information corresponding to a broadcasting channel that is same as and broadcasting time zones that are different from (one precedes and the other follows) the broadcasting program information displayed on the front face 501, i.e., corresponding to the broadcasting channel KBS 1TV 9-1 and broadcasting time zones 0:30 am-6:00 am and 12:00 pm-5:00 pm, is displayed on the faces 502 and 504 that are vertically adjacent to the front face 501. Broadcasting program information corresponding to a broadcasting time zone that is the same as, broadcasting time zones and a broadcast channel that are different from, the broadcasting program information displayed on the front face 501, i.e., corresponding to broadcasting channels 11-1 MBC TV and 6-1 SBS TV and the broadcasting time zone 6:00 am-12:00 am, is displayed on the faces 503 and 505 that are horizontally adjacent to the front face 501.

The EPG providing apparatus 100 according to the present invention searches for and provides broadcasting program information corresponding to another broadcasting channel according to a user input signal for the user's left and right searches as indicated by an arrow C and searches for and provides broadcasting program information corresponding to another broadcasting times zone according to a user input signal for the user's up and down searches as indicated by an arrow D. The amount of broadcasting program information displayed on faces of a 3D hexagon may be adjusted in consideration of the area of each face or user readability. In addition, although broadcasting time zones and titles of broadcasting programs are displayed as broadcasting program information in FIG. 5A, other broadcasting program information may be additionally displayed. Moreover, the time-based searching direction is the a vertical direction and the channel-based searching direction is the horizontal direction in FIG. 5A, but a reverse implementation thereto is also possible.

Figure 5B:
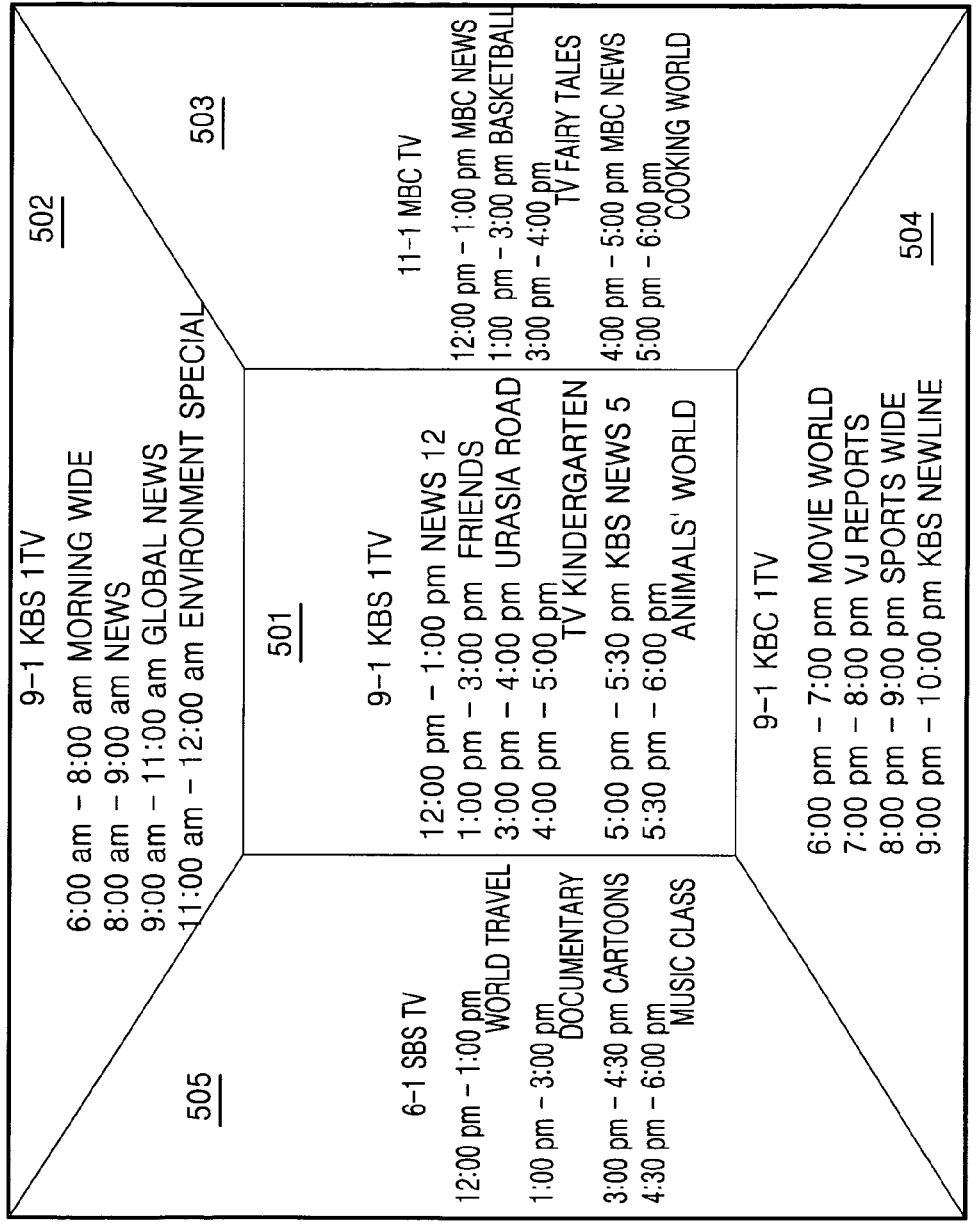

FIG. 5B illustrates an EPG screen configured according to the user input signal for the user's up and down searches according to the second embodiment of the present invention. The control unit 130 controls the EPG screen configuring unit 140 to configure an EPG screen based on the user input signal for the user's up and down searches to request a search for broadcasting program information corresponding to another broadcasting time zone.

For example, if the user inputs a user input signal using up and down buttons of a remote controller, the control unit 130 may search in the storing unit 150 for broadcasting program information corresponding to another broadcasting time zone requested by the user. The control unit 130 then determines the broadcasting program information corresponding to the requested broadcasting time zone as broadcasting program information to be displayed on the front face 501 of the hexagon 500 and determines broadcasting program information to be displayed on the faces 502, 503, 504, and 505 adjacent to the front face 501 based on the broadcasting program information displayed on the front face 501 of the hexagon 500. As mentioned above, the control unit 130 determines broadcasting program information corresponding to a broadcasting channel that is the same as, and a broadcasting time zone that is different from, the broadcasting program information displayed on the front face 501 of the hexagon 500 as broadcasting program information to be displayed on faces adjacent in a predetermined direction with respect to the front face 501 of the hexagon 500, e.g., the faces 502 and 504 that are vertically adjacent to the front face 501 in FIG. 5B. The control 130 unit then determines broadcasting program information corresponding to a broadcasting channel that is different from, and a broadcasting time zone that is the same as, the broadcasting program information displayed on the front face 501 of the hexagon 500 as broadcasting program information to be displayed on faces adjacent perpendicularly to the predetermined direction with respect to the front face 501, e.g., the faces 503 and 505 that are horizontally adjacent to the front face 501 in FIG. 5B. The EPG screen configuring unit 140 then configures an EPG screen under the control of the control unit 130 such that the determined broadcasting program information is displayed on the front face 501 and the faces 502, 503, 504, and 505 adjacent to the front face 501.

FIG. 5B illustrates one of the EPG screens during a process of searching for broadcasting program information of KBS 1TV corresponding to another broadcasting time zone according to the user input signal for the user's up and down searches in the EPG screen of FIG. 5A. Broadcasting program information of KBS 1TV corresponding to a broadcasting time zone 12:00 pm-6:00 pm requested by the user is displayed on the front face 501 of the hexagon 500.

Broadcasting program information of KBS 1TV corresponding to a broadcasting time zone 6:00 am-12:00 am that precedes the broadcasting program information displayed on the front face 501 of the hexagon 500 is displayed on the top face 502 that is vertically adjacent to the front face 501. Broadcasting program information of KBS 1TV corresponding to the broadcasting time zone 6:00 pm-10:00 pm that follows the broadcasting program information displayed on the front face 501 of the hexagon 500 is displayed on the bottom face 504 that is vertically adjacent to the front face 501.

Broadcasting information corresponding to broadcasting channels 11-1 MBC TV and 6-1 SBS TV that are different from, and a broadcasting time zone 12:00 pm-6:00 pm that is the same as, the broadcasting program information displayed on the front face 501 is displayed on the faces 503 and 505 that are horizontally adjacent to the front face 501. Thus, the EPG providing apparatus 100 according to the present invention interactively responds to the user input signal for the user's up and down searches to allow a polygon to display broadcasting program information corresponding to the same broadcasting channel and another broadcasting time zone while moving vertically. Therefore, the user can intuitively search an EPG using the EPG providing apparatus 100 according to the present invention.

Figure 5C:
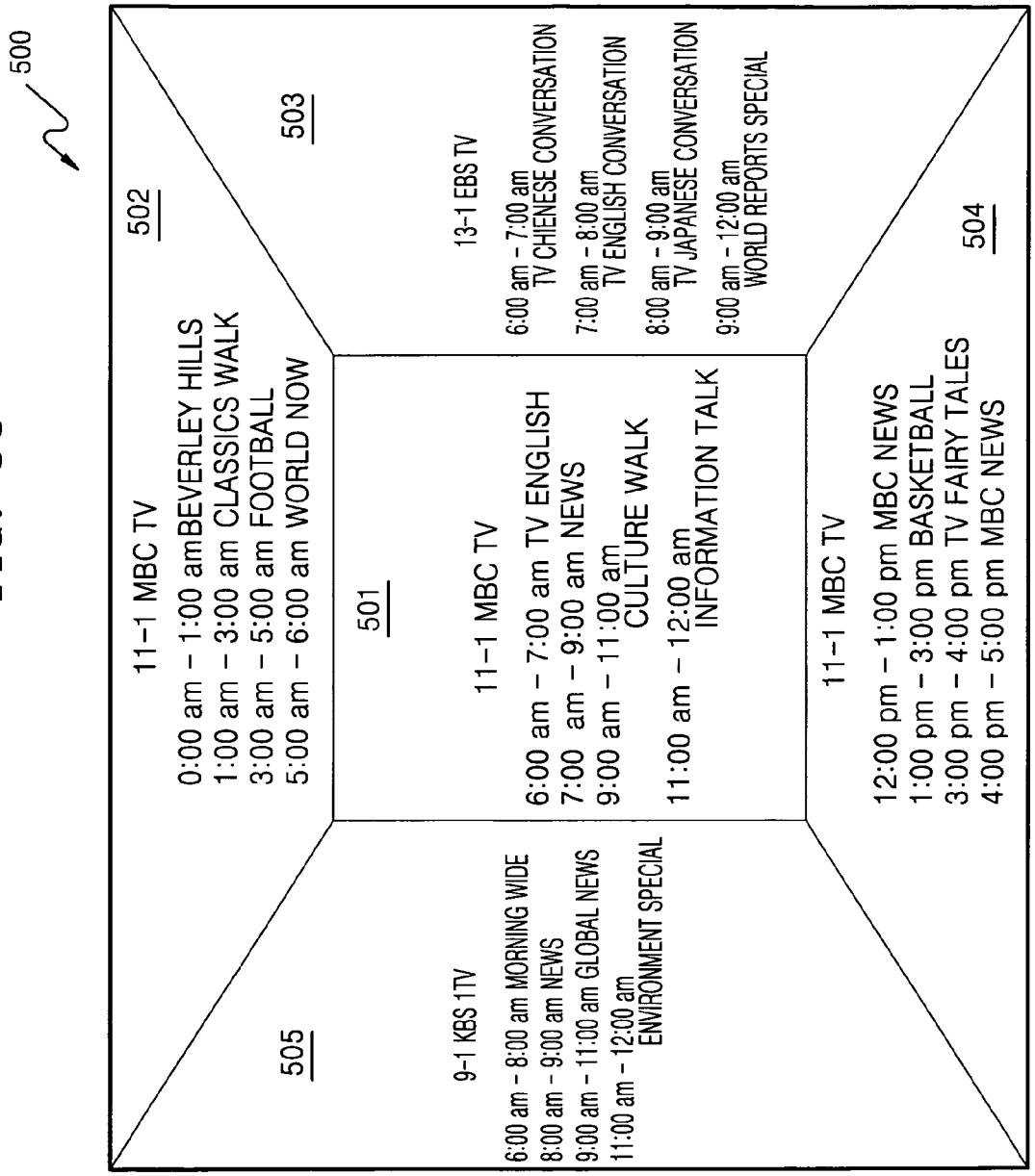

FIG. 5C illustrates an EPG screen configured based on the user input signal for the user's left and right searches according to the second embodiment of the present invention. The control unit 130 controls the EPG screen configuring unit 140 to configure an EPG screen based on the user input signal for the user's left and right searches to request a search for broadcasting program information corresponding to another broadcasting channel.

For example, if the user inputs the user input signal for the user's left and right searches using left and right buttons of the remote controller, the control unit 130 searches for broadcasting program information corresponding to a next broadcasting channel requested by the user. The control unit 130 then determines broadcasting program information corresponding to the requested broadcasting channel as broadcasting program information to be displayed on the front face 501 of the hexagon 500 and determines broadcasting program information to be displayed on the faces 502, 503, 504, and 505 adjacent to the front face 501 based on the broadcasting program information displayed on the front face 501. As mentioned above, the control unit 130 determines broadcasting program information corresponding to a broadcasting channel that is the same as, and broadcasting time zones that are different from, the broadcasting program information displayed on the front face 501 of the hexagon 500 as broadcasting program information to be displayed on faces adjacent in a predetermined direction with respect to the front face 501, e.g., the faces 502 and 504 that are vertically adjacent to the front face 501 in FIG. 5C. The control unit 130 determines broadcasting program information corresponding to a broadcasting time zone that is the same as, and broadcasting channels that are different from, the broadcasting program information displayed on the front face 501 of the hexagon 500 as broadcasting program information to be displayed on faces adjacent perpendicularly to the predetermined direction with respect to the front face 501, e.g., the faces 503 and 505 that are horizontally adjacent to the front face 501 in FIG. 5C. The EPG screen configuring unit 140 then configures an EPG screen under the control of the control unit 130 such that the determined broadcasting program information is displayed on the front face 501 and the faces 502, 503, 504, and 505 adjacent to the front face 501.

FIG. 5C illustrates one of EPG screens during a process of searching for broadcasting program information corresponding to another broadcasting channel based on the same broadcasting time zone according to the user input signal for user's left and right searches in the EPG screen of FIG. 5A. Broadcasting program information corresponding to a broadcasting channel 11-1 MBC TV requested by the user and a broadcasting time zone 6:00 am-12:00 am is displayed on the front face 501 of the hexagon 500.

Broadcasting program information of 11-1 MBC TV corresponding to a broadcasting time zone 0:00 am-6:00 am that precedes the broadcasting program information displayed on the front face 501 of the hexagon 500 is displayed on the top face 502 that is vertically adjacent to the front face 501. Broadcasting program information of 11-1 MBC TV corresponding to the broadcasting time zone 12:00 pm-5:00 pm that follows the broadcasting program information displayed on the front face 501 of the hexagon 500 is displayed on the bottom face 504 that is vertically adjacent to the front face 501.

Broadcasting information corresponding to broadcasting channels 13-1 EBC TV and 9-1 KBS TV that are different from, and a broadcasting time zone 6:00 am-12:00 am that is the same as, the broadcasting program information displayed on the front face 501 is displayed on the faces 503 and 505 that are horizontally adjacent to the front face 501. Thus, the EPG providing apparatus 100 according to the present invention interactively responds to the user input signal for user's up and down searches to allow a polygon to display broadcasting program information corresponding to the same broadcasting time zone and another broadcasting channel while moving horizontally. Therefore, the user can intuitively searches an EPG using the EPG providing apparatus 100 according to the present invention.

Figure 6:
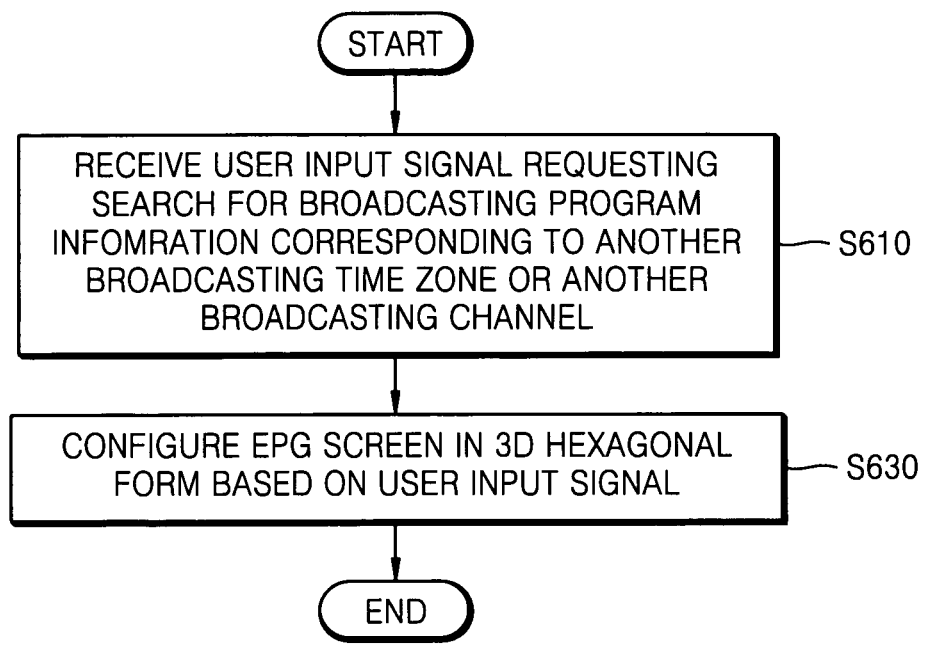
FIG. 6 is a flowchart illustrating an EPG providing method according to a third embodiment of the present invention.

FIG. 6 is a flowchart illustrating an EPG providing method according to a third embodiment of the present invention.

The control unit 130 receives a user input signal requesting a search for broadcasting program information corresponding to another broadcasting time zone or another broadcasting channel in operation S610. Based on the user input signal, the control unit 130 controls the EPG screen configuring unit 140 to configure an EPG screen in which broadcasting program information corresponding to another broadcasting time zone or another broadcasting channel is displayed on a 3D hexagon in operation S630. The EPG screen is configured such that broadcasting program information is displayed on the front face of the 3D hexagon and four faces adjacent to the front face.

Figure 7:
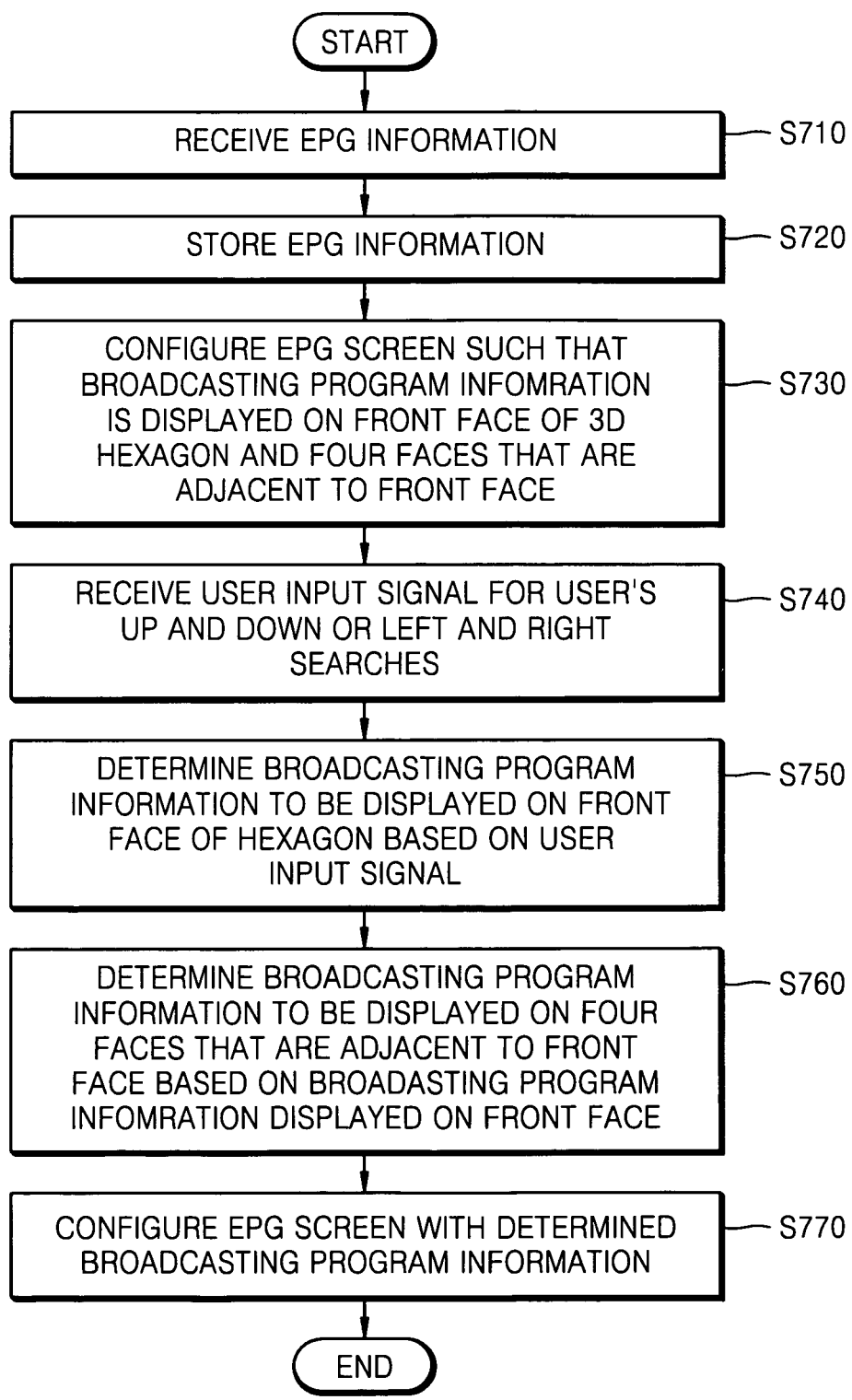
FIG. 7 is a flowchart illustrating an EPG providing method according to a fourth embodiment of the present invention.

FIG. 7 is a flowchart illustrating an EPG providing method according to a fourth embodiment of the present invention.

The broadcasting signal processing unit 110 processes a broadcasting signal including EPG information or receives EPG information from an EPG server connected to a network in operation S710. The control unit 130 stores the received EPG information in the storing unit 150 in operation S720. The EPG screen configuring unit 140 configures an EPG screen such that broadcasting program information is displayed on the front face of the 3D hexagon and the faces adjacent to the front face using the EPG information, and the configured EPG screen is displayed through an output device in operation S730.

Once a user input signal for the user's up and down or left and right searches is input to request a search for broadcasting program information corresponding to another broadcasting time zone or another broadcasting channel in operation S740, the control unit 130 determines broadcasting program information corresponding to the requested broadcasting time zone or broadcasting channel as broadcasting program information to be displayed on the front face of the hexagon based on the user input signal in operation S750. The control unit 130 then determines broadcasting program information to be displayed on the faces adjacent to the front face based on the broadcasting program information to be displayed on the front face of the hexagon in operation S760.

In other words, broadcasting program information to be displayed on faces adjacent in a predetermined direction with respect to the front face of the hexagon is determined as broadcasting program information corresponding to a broadcasting channel that is the same as, and broadcasting time zones that are different from, the broadcasting program information displayed on the front face of the hexagon, and broadcasting program information to be displayed on faces adjacent perpendicularly to the predetermined direction with respect to the front face of the hexagon is determined as broadcasting program information corresponding to a broadcasting time zone that is the same as, and broadcasting channels that are different from, the broadcasting program information displayed on the front face of the hexagon. The EPG screen configuring unit 140 then configures an EPG screen such that the determined broadcasting program information is displayed on corresponding faces of the 3D hexagon, i.e., the front face and the faces adjacent to the front face of the 3D hexagon in operation S770. The configured EPG screen is displayed through an output device.

As described above, according to the present invention, the user can easily and intuitively search for broadcasting program information included in an EPG through a 3D EPG screen.

Meanwhile, the EPG providing method according to the present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An EPG (electronic programming guide) providing apparatus comprising:
   an EPG screen configuring unit configuring an EPG screen such that broadcasting program information is displayed on at least three faces of a 3D (three-dimensional) polyhedron; and
   a control unit determining first broadcasting program information to be displayed on a first face of the polyhedron, second broadcasting program information corresponding to a broadcasting channel that is the same as and a broadcasting time zone that is different from the first broadcasting program as broadcasting information to be displayed on a second face positioned in a first direction with respect to the first face of the polyhedron and third broadcasting program information corresponding to a broadcasting time zone that is the same as and a broadcasting channel that is different from the first broadcasting program information as broadcasting information to be displayed on a third face positioned in a second direction with respect to the first face of the polyhedron,
   wherein the control unit, based on time-zone-change user input signal, re-determines at least a part of the second broadcasting program information as broadcasting information to be displayed on the first face, and replaces the third broadcasting program information with fourth broadcasting program information as broadcasting information to be displayed on the third face, the fourth broadcasting program information being corresponding to the broadcasting time that is the same as the part of the second broadcasting program information and corresponding to the broadcasting channel that is the same as the third broadcasting program information.

2. The EPG providing apparatus of claim 1, wherein the 3D polygon is a hexagon.

3. The EPG providing apparatus of claim 1, further comprising:
   a broadcasting signal processing unit receiving and processing a broadcasting signal including EPG information and broadcasting program contents;
   a network unit receiving the EPG information from an EPG server connected to a network;
   a storing unit storing the received EPG information and broadcasting program contents; and
   a decoder decoding the broadcasting program contents processed by the broadcasting signal processing unit or read from the storing unit.

4. The EPG providing apparatus of claim 1, wherein the control unit controlling the EPG screen configuring unit to configure the EPG screen such that broadcasting program information corresponding to another broadcasting time zone or another broadcasting channel is displayed on the EPG screen based on a user input signal requesting a search for the broadcasting program information corresponding to another broadcasting time zone or another broadcasting channel.

5. The EPG providing apparatus of claim 1, wherein the control unit re-determines the first broadcasting program information based on a user input signal requesting a search for the broadcasting program information corresponding to another broadcasting time zone or another broadcasting channel and re-determines the second broadcasting program information and the third broadcasting program information based on the re-determined first broadcasting program information.

6. The EPG providing apparatus of claim 4, wherein the control unit re-determines the first broadcasting program information corresponding to another broadcasting time zone requested by a user based on a user input signal for the user's up and down or left and right searches entered on a user input device and re-determines the second broadcasting program information and the third broadcast program information based on the re-determined first broadcasting program information.

7. The EPG providing apparatus of claim 4, wherein the control unit re-determines the first broadcasting program information corresponding to another broadcasting channel requested by a user based on a user input signal for the user's up and down or left and right searches entered on a user input device and re-determines the second broadcasting program information and the third broadcasting program information based on the re-determined first broadcasting program information.

8. An EPG (electronic programming guide) providing method comprising:
   configuring an EPG screen such that the broadcasting program information is displayed in the form of a 3D (three-dimensional) polyhedron based on the user input signal;
   displaying the configured EPG screen on a display,
   wherein configuring the EPG screen comprises determining first broadcasting program information to be displayed on a first face of the polyhedron, second broadcasting program information corresponding to a broadcasting channel that is the same as and a broadcasting time zone that is different from the first broadcasting program information as broadcasting information to be displayed on a second face positioned in a first direction with respect to the first face of the polyhedron and third broadcasting program information corresponding to a broadcasting time zone that is the same as and a broadcasting channel that is different from the first broadcasting program information as broadcasting information to be displayed on a third face positioned in a second direction with respect to the first face of the polyhedron,
   wherein configuring the EPG further comprising re-determining at least a part of the second broadcasting program information as broadcasting information to be displayed on the first face, and replacing the third broadcasting program information with fourth broadcasting program information as broadcasting information to be displayed on the third face, the fourth broadcasting program being corresponding to the broadcasting time that is the same as the part of the second broadcasting program information and corresponding to the broadcasting channel that is the same as the third broadcasting program information.

9. The EPG providing method of claim 8, wherein the 3D polygon is a hexagon.

10. The EPG providing method of claim 8, further comprising:
    receiving EPG information through a broadcasting signal or from an EPG server connected to a network;
    storing the received EPG information.

11. A non-transitory computer-readable recording medium having recorded thereon a program for implementing an EPG providing method of claim 8.

12. The EPG providing method of claim 8, further comprising: receiving a user input signal requesting a search for broadcasting program information,
    wherein the configuring of the EPG screen comprises configuring an EPG screen such that the broadcasting program information is displayed in the form of a 3D (three-dimensional) polyhedron based on the user input signal.

13. The EPG providing method of claim 8, further comprising: receiving a user input signal requesting a search for broadcasting program information, wherein the configuring of the EPG screen comprises re-determining the first broadcasting program information based on the user input signal requesting a search for the broadcasting program information and re-determining the second broadcasting program information and the third broadcasting program information based on the re-determined first broadcasting program information.

14. The EPG providing method of claim 13, wherein the receiving of the user input signal comprises receiving a user input signal for user's up and down or left and right searches, and the configuring of the EPG screen comprises:

re-determining the first broadcasting program information corresponding to another broadcasting time zone requested by a user based on the user input signal for the user's up and down or left and right searches entered using a user input device;

re-determining the second broadcasting program information and the third broadcasting program information based on the re-determined first broadcasting program information; and configuring the EPG screen such that the re-determined broadcasting program information are displayed on the first face and the other faces of the polyhedron.

15. The EPG providing method of claim 13, wherein the receiving of the user input signal comprises receiving a user input signal for the user's up and down or left and right searches from the user input device, and the configuring of the EPG screen comprises:

re-determining the first broadcasting program information corresponding to another broadcasting channel requested by a user based on a user input signal for the user's up and down or left and right searches entered using the user input device;

re-determining the second broadcasting program information and the third broadcasting program information based on the re-determined first broadcasting program information; and configuring the EPG screen such that the re-determined broadcasting program information are displayed on the first face and the other faces of the polyhedron.

* * * * *